(12) United States Patent
Lee et al.

(10) Patent No.: US 12,036,600 B2
(45) Date of Patent: Jul. 16, 2024

(54) METHOD FOR MANUFACTURING TORSION BEAM

(71) Applicants: POSCO, Pohang-si (KR); AUSTEM CO., LTD., Cheonan-si (KR)

(72) Inventors: Hong-Woo Lee, Incheon (KR); Dong-Yoon Seok, Incheon (KR); Myong-Ho Shin, Cheonan-si (KR); Nam-Sik Sa, Cheonan-si (KR)

(73) Assignees: POSCO CO., LTD, Pohang-si (KR); AUSTEM CO., LTD., Cheonan-si (KR)

( * ) Notice: Subject to any disclaimer, the term of this patent is extended or adjusted under 35 U.S.C. 154(b) by 670 days.

(21) Appl. No.: 17/298,131

(22) PCT Filed: Nov. 25, 2019

(86) PCT No.: PCT/KR2019/016284
§ 371 (c)(1),
(2) Date: May 28, 2021

(87) PCT Pub. No.: WO2020/111697
PCT Pub. Date: Jun. 4, 2020

(65) Prior Publication Data
US 2022/0016684 A1    Jan. 20, 2022

(30) Foreign Application Priority Data

Nov. 30, 2018   (KR) .................. 10-2018-0152529

(51) Int. Cl.
*B21D 5/10*       (2006.01)
*B21C 37/08*      (2006.01)
(Continued)

(52) U.S. Cl.
CPC ............ *B21D 5/10* (2013.01); *B21C 37/0803* (2013.01); *B21D 22/02* (2013.01); *B21D 53/88* (2013.01);
(Continued)

(58) Field of Classification Search
CPC ...... C21D 9/085; C21D 9/50; B21C 37/0803; B21C 37/16; B21D 5/10; B21D 53/88; B23K 37/003
See application file for complete search history.

(56) References Cited

U.S. PATENT DOCUMENTS 6,601,427 B2   8/2003   Kondou et al.
6,758,921 B1   7/2004   Streubel et al.
(Continued)

FOREIGN PATENT DOCUMENTS

CN   101623996 A   1/2010
CN   101772433 A   7/2010
(Continued)

OTHER PUBLICATIONS

Method of Manufacture of Elastic Metal Sealing Gaskets, Involves Preparing by Welding Butt-end of an Austenitic Dispersion Hardening Alloy (Year: 2018).*
(Continued)

*Primary Examiner* — Jermie E Cozart
(74) *Attorney, Agent, or Firm* — Morgan, Lewis & Bockius LLP

(57) ABSTRACT

The present invention provides a method for manufacturing a torsion beam, the method comprising: a planarization step, in which a protruding portion of an upper mold presses the opposite end portions in the width direction of the blank to be plastically deformed to be flat while the opposite end portions in the width direction of the blank are supported by a side cam to face each other; a welding and bonding step for
(Continued)

bonding the planarized opposite end portions in the width direction of the blank via welding; and a quenching step for heating the welded and bonded blank within a range of 900 to 970° C. for a retaining time within a range of 1 to 20 minutes and for cooling down the blank in a treatment liquid including at least one of water and oil in a range of 20 to 90° C.

10 Claims, 10 Drawing Sheets

(51) Int. Cl.
    *B21D 22/02*      (2006.01)
    *B21D 53/88*      (2006.01)
    *B23K 31/02*      (2006.01)
    *C21D 9/08*      (2006.01)
    *C21D 9/50*      (2006.01)
    *B21C 37/16*      (2006.01)
    *B23K 37/00*      (2006.01)

(52) U.S. Cl.
    CPC ............ *B23K 31/027* (2013.01); *C21D 9/085* (2013.01); *C21D 9/50* (2013.01); *B21C 37/16* (2013.01); *B23K 37/003* (2013.01)

(56) References Cited

U.S. PATENT DOCUMENTS

| | | | |
|---|---|---|---|
| 2003/0044632 A1 | 3/2003 | Schonleber et al. | |
| 2007/0075518 A1 | 4/2007 | Murata | |
| 2008/0289393 A1* | 11/2008 | Lee | B21D 22/025 72/352 |
| 2010/0009114 A1 | 1/2010 | Kim | |
| 2010/0187788 A1 | 7/2010 | Choi et al. | |
| 2011/0036470 A1* | 2/2011 | Kim | C21D 1/673 148/653 |
| 2011/0037207 A1* | 2/2011 | Kim | C21D 1/63 266/160 |
| 2015/0151352 A1* | 6/2015 | Peters | B21D 53/88 72/401 |
| 2016/0008863 A1 | 1/2016 | Friesen et al. | |
| 2016/0068035 A1 | 3/2016 | Rao et al. | |
| 2017/0066036 A1* | 3/2017 | Brüggenbrock | B21D 5/06 |
| 2018/0229575 A1 | 8/2018 | Chelikani et al. | |

FOREIGN PATENT DOCUMENTS

| | | | |
|---|---|---|---|
| CN | 102756177 A | 10/2012 | |
| CN | 105251842 A | 1/2016 | |
| CN | 105531128 A | 4/2016 | |
| CN | 106282520 A | 1/2017 | |
| CN | 106794738 A | 5/2017 | |
| CN | 108467921 A | 8/2018 | |
| CN | 108725125 A | 11/2018 | |
| EP | 2143511 A1 * | 1/2010 | ............ B21D 35/00 |
| EP | 3239339 A1 | 11/2017 | |
| JP | 2006-103570 A | 4/2006 | |
| JP | 2012-131316 A | 7/2012 | |
| KR | 10-2007-0014326 A | 2/2007 | |
| KR | 10-0935018 B1 | 1/2010 | |
| KR | 10-2011-0118607 A | 10/2011 | |
| KR | 10-1304752 B1 | 9/2013 | |
| KR | 10-2014-0026039 A | 3/2014 | |
| KR | 101420009 B1 * | 7/2014 | |
| KR | 10-1657834 B1 | 9/2016 | |
| KR | 10-1666951 B1 | 10/2016 | |
| KR | 10-1724026 B1 | 4/2017 | |
| KR | 10-1805604 B1 | 12/2017 | |
| WO | 2014/147827 A1 | 9/2014 | |

OTHER PUBLICATIONS

International Search Report issued in corresponding International Patent Application No. PCT/KR2019/016284 dated Mar. 5, 2020.
Extended European Search Report dated Jan. 4, 2022 issued in European Patent Application No. 19889930.4.
Chinese Office Action dated Aug. 31, 2022 issued in Chinese Patent Application No. 201980078796.3 (with English translation).

* cited by examiner

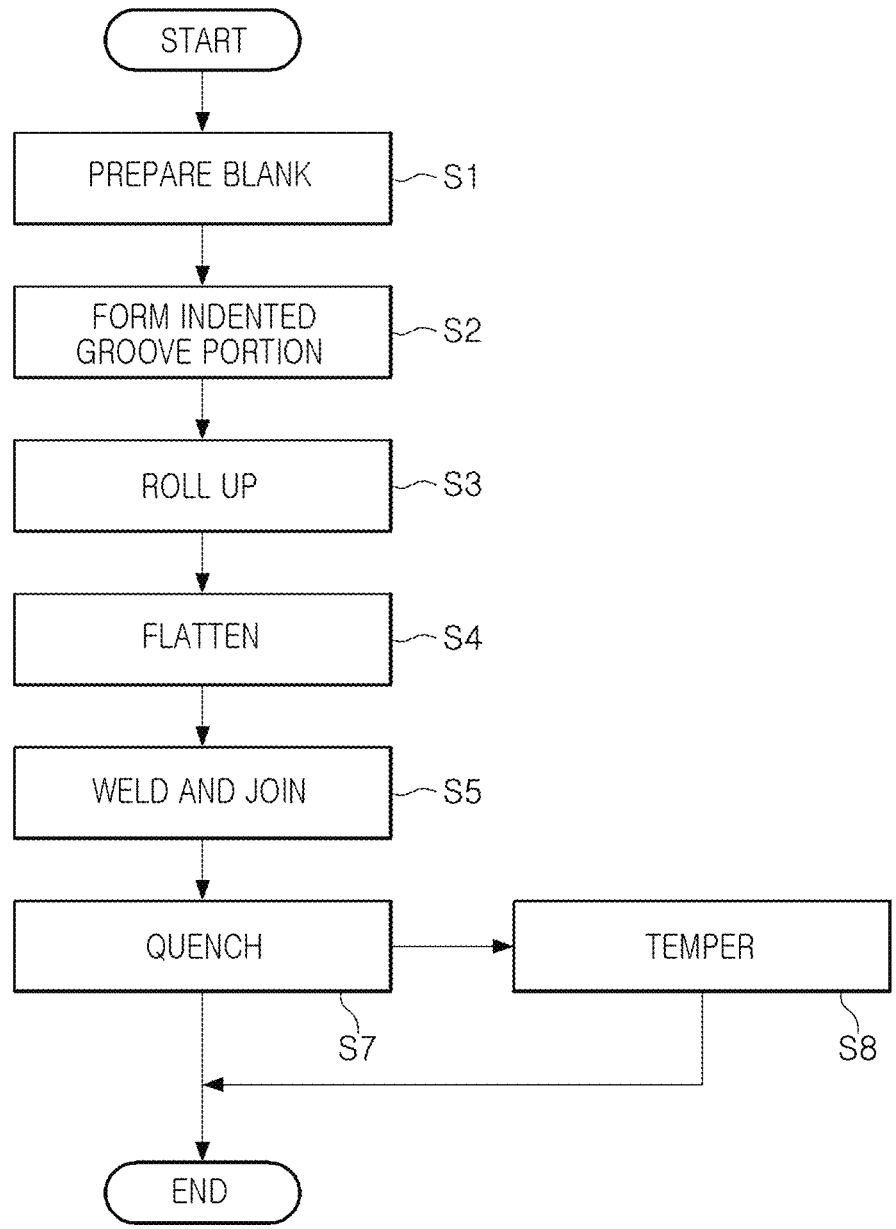
[Figure 1]

[Figure 2]
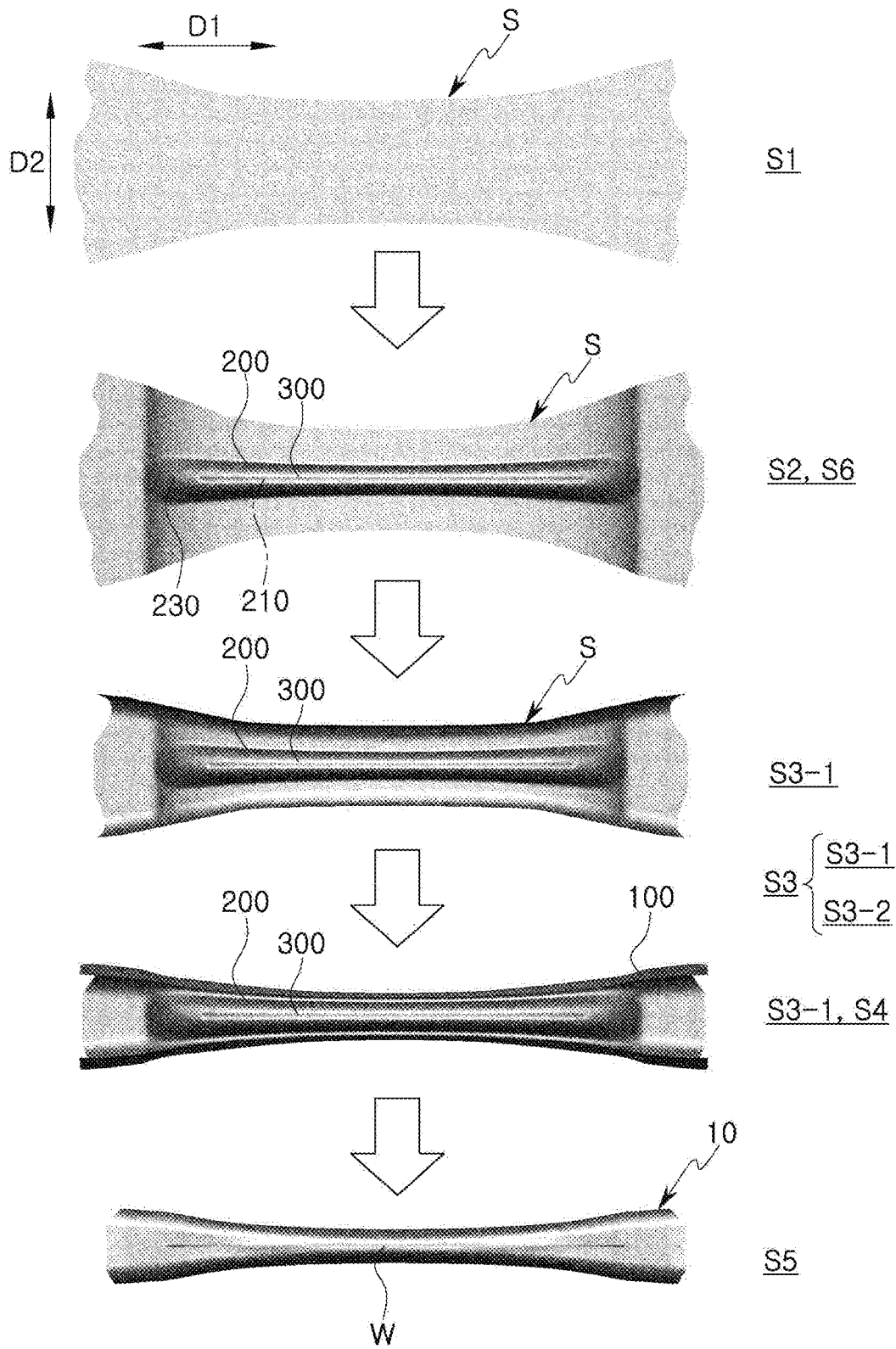

[Figure 3]
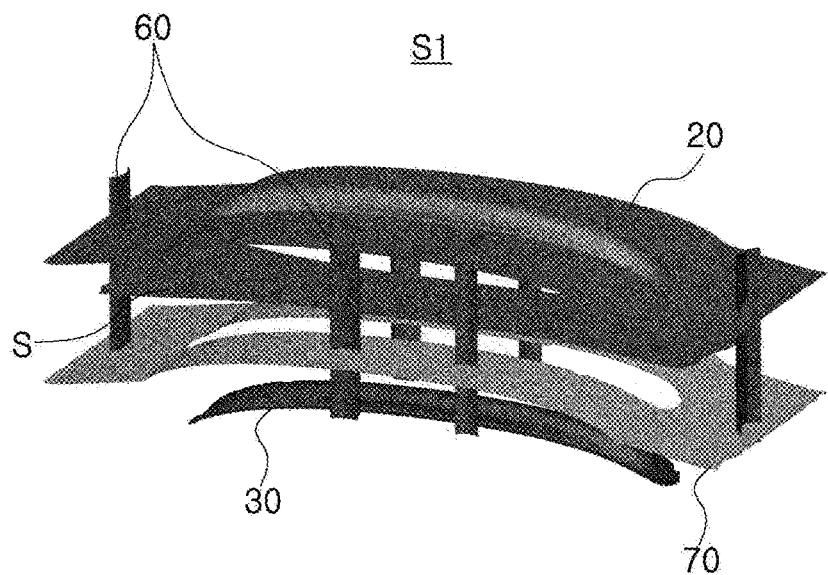
[Figure 4]
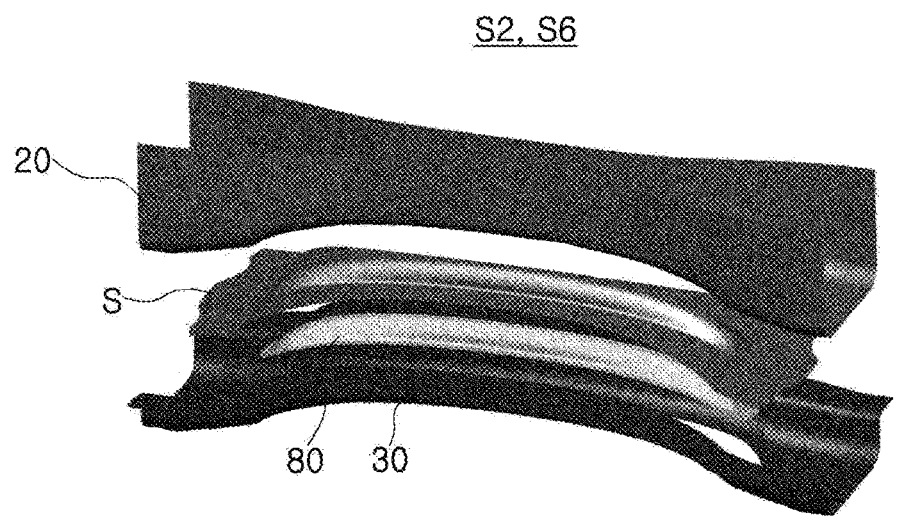

[Figure 5]
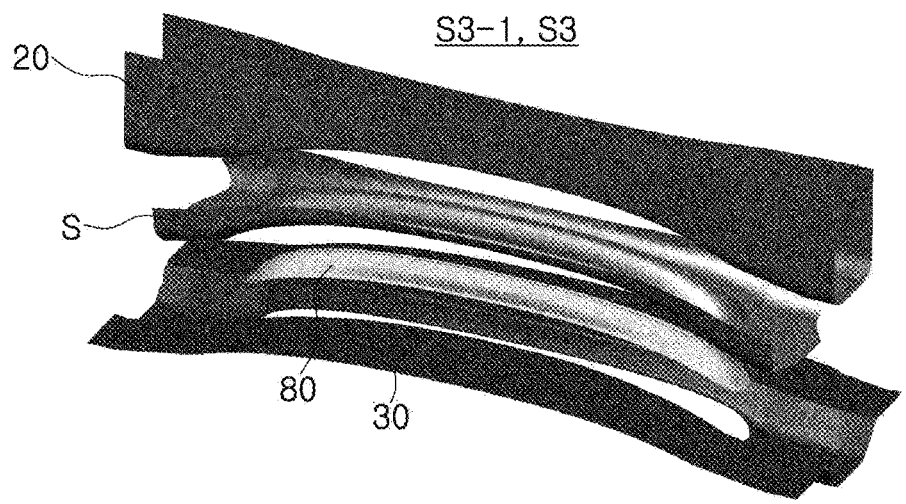
[Figure 6]
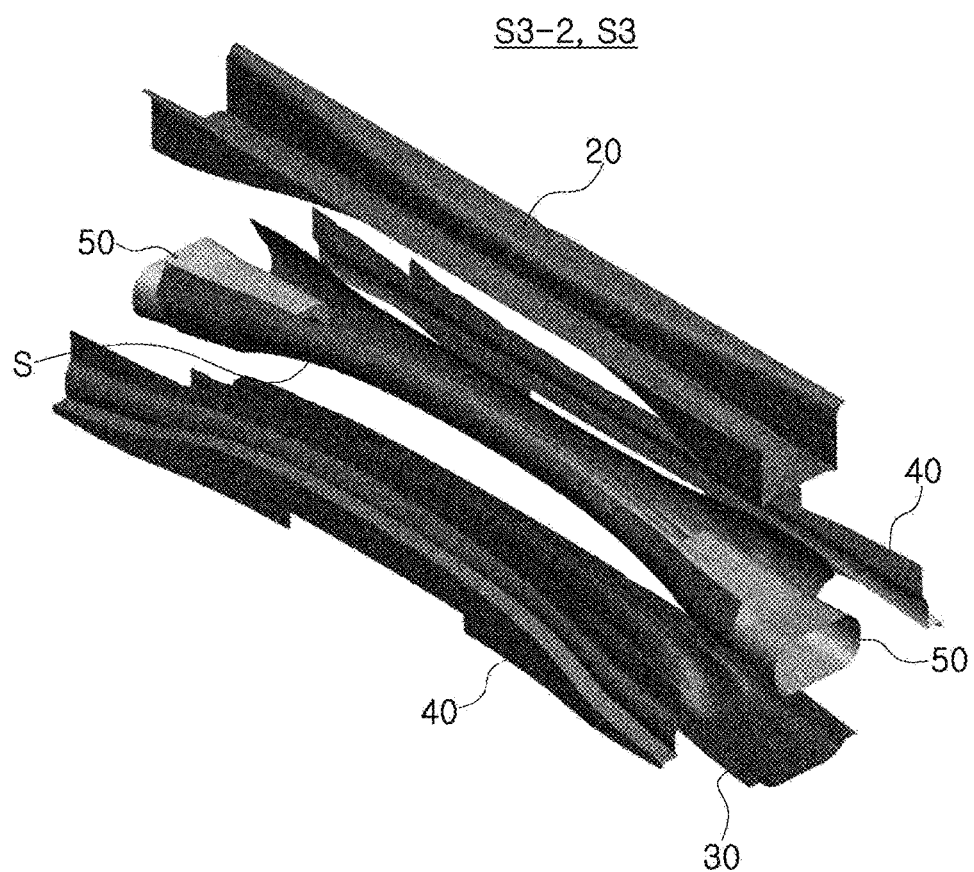

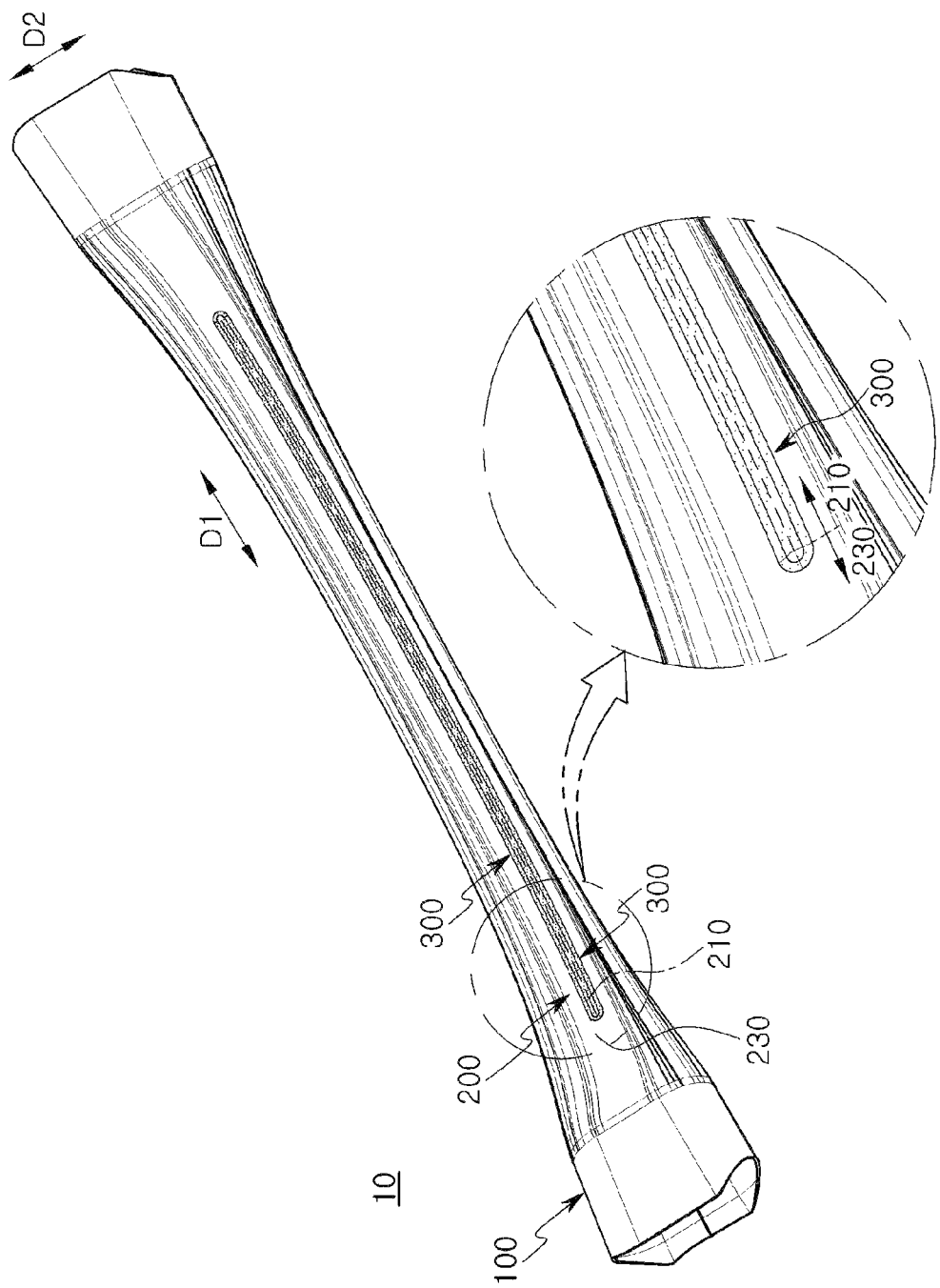

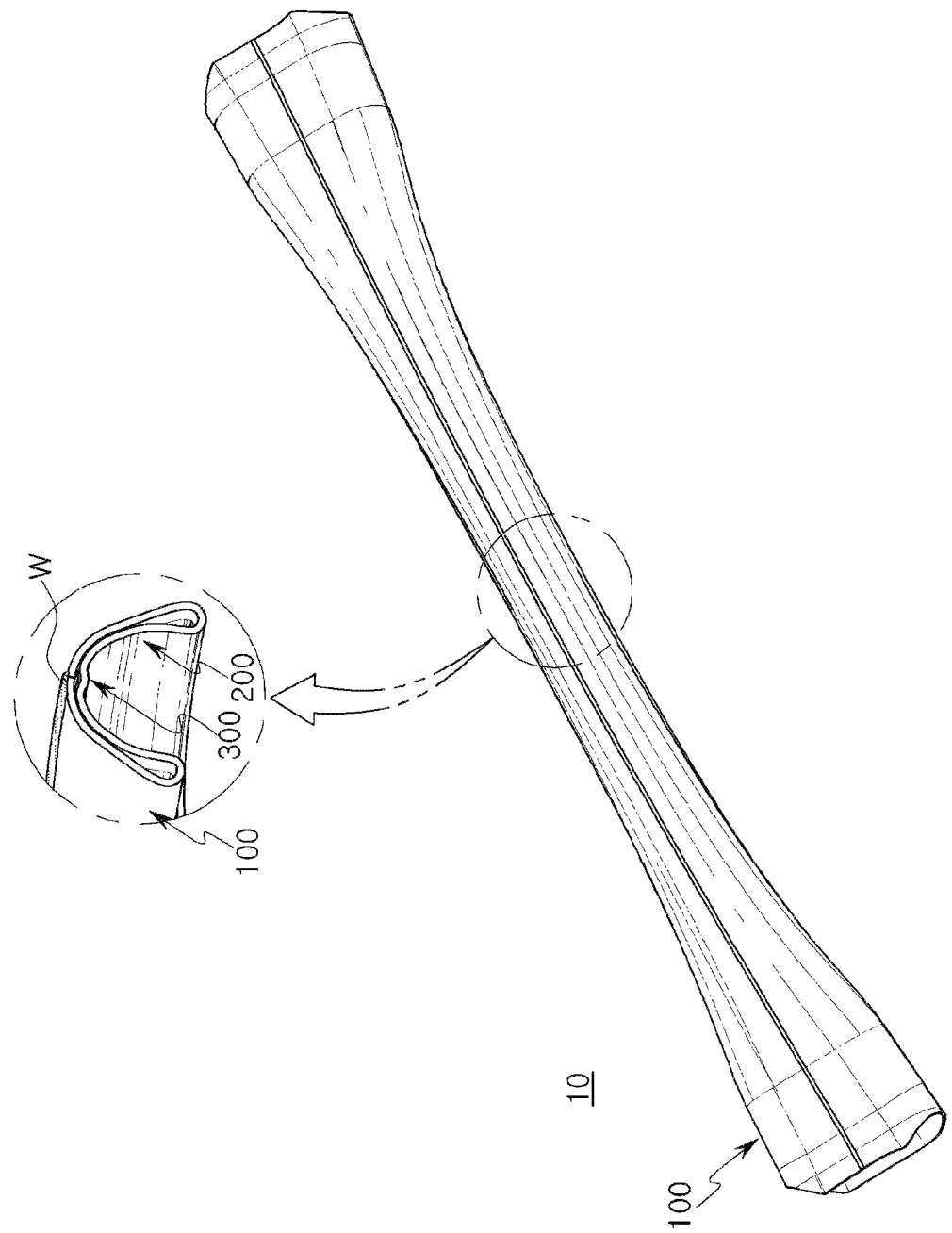
[Figure 7b]

[Figure 8a]
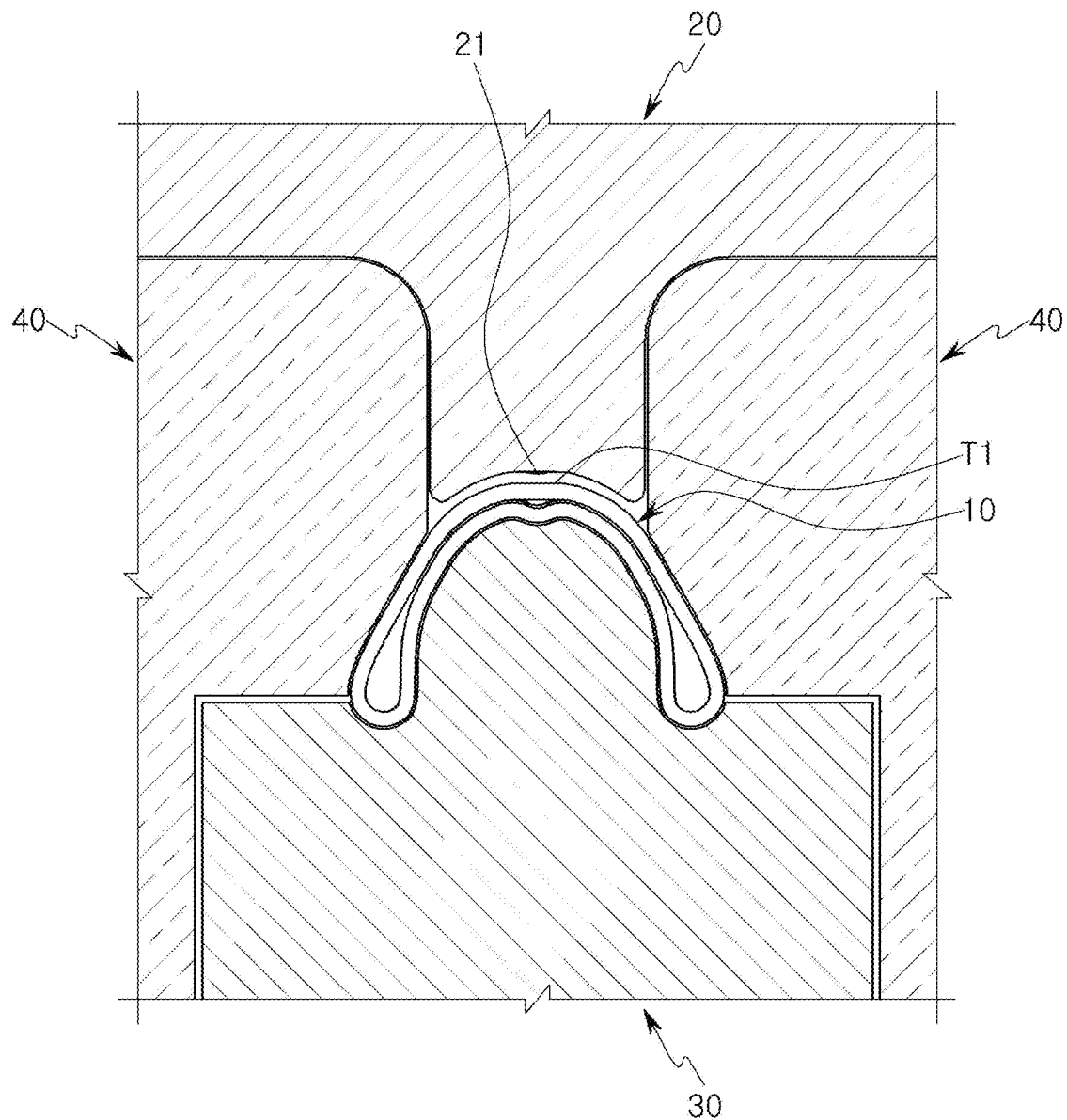

[Figure 8b]
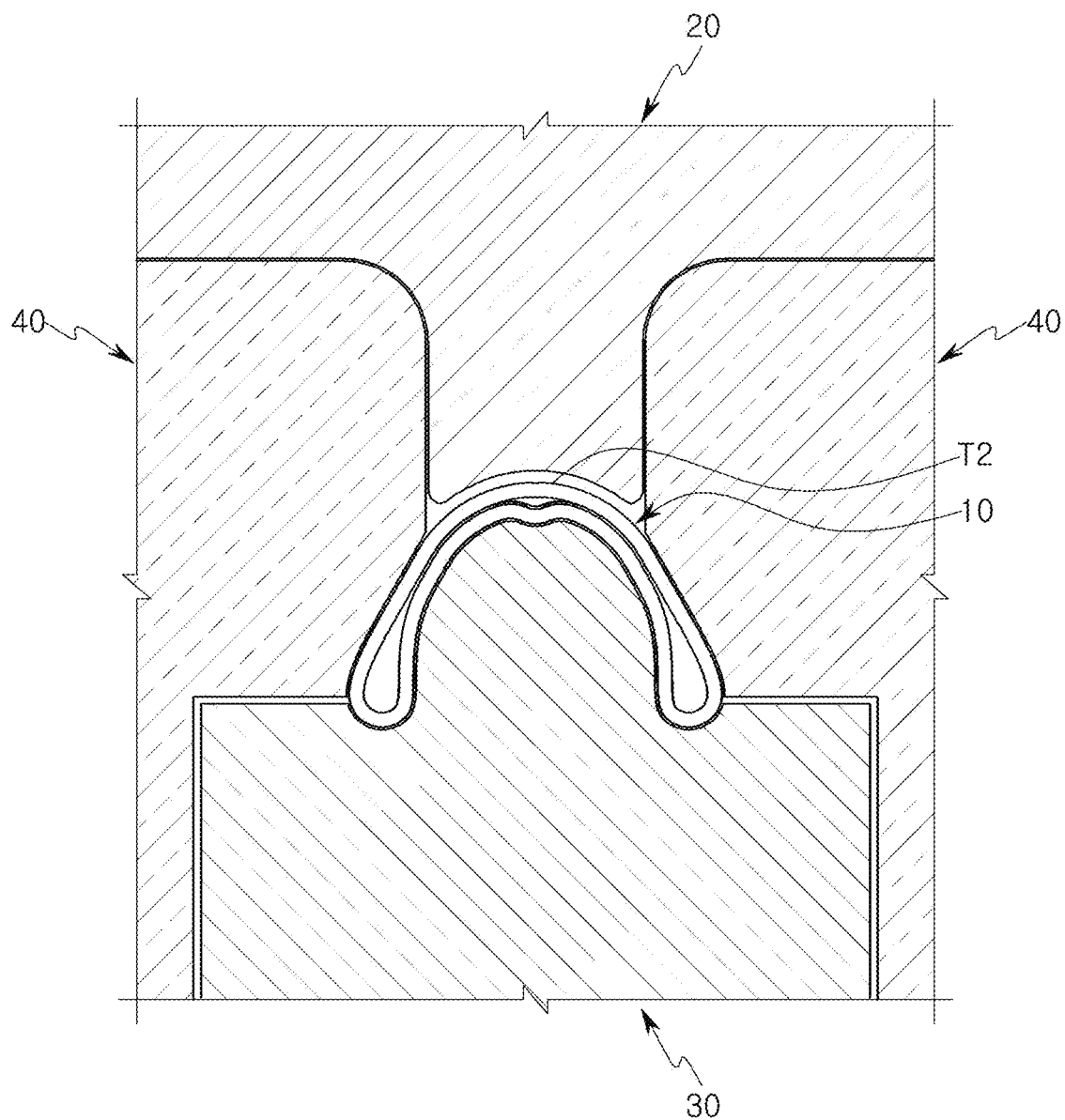

[Figure 9a]
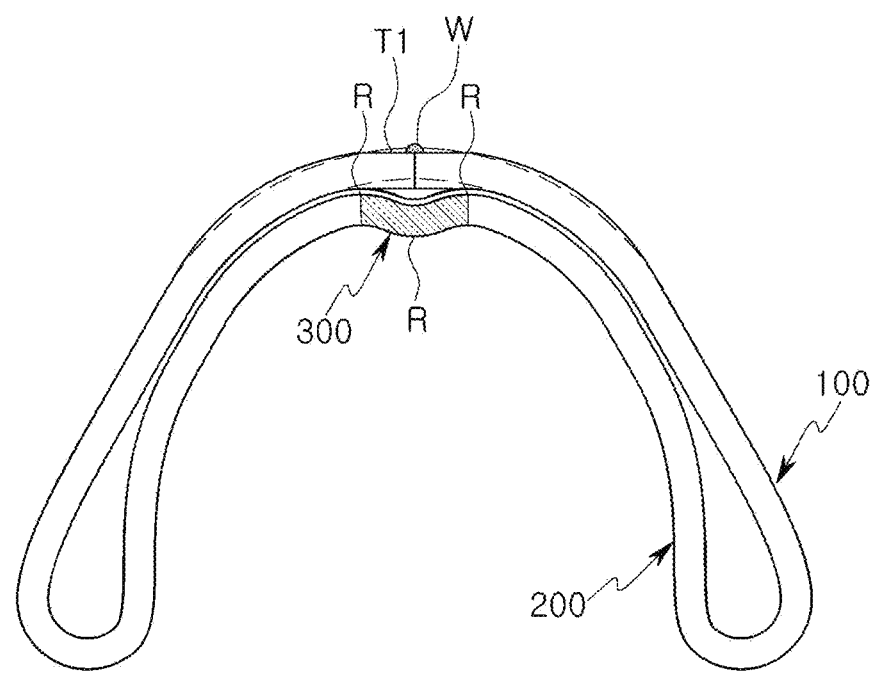

[Figure 9b]
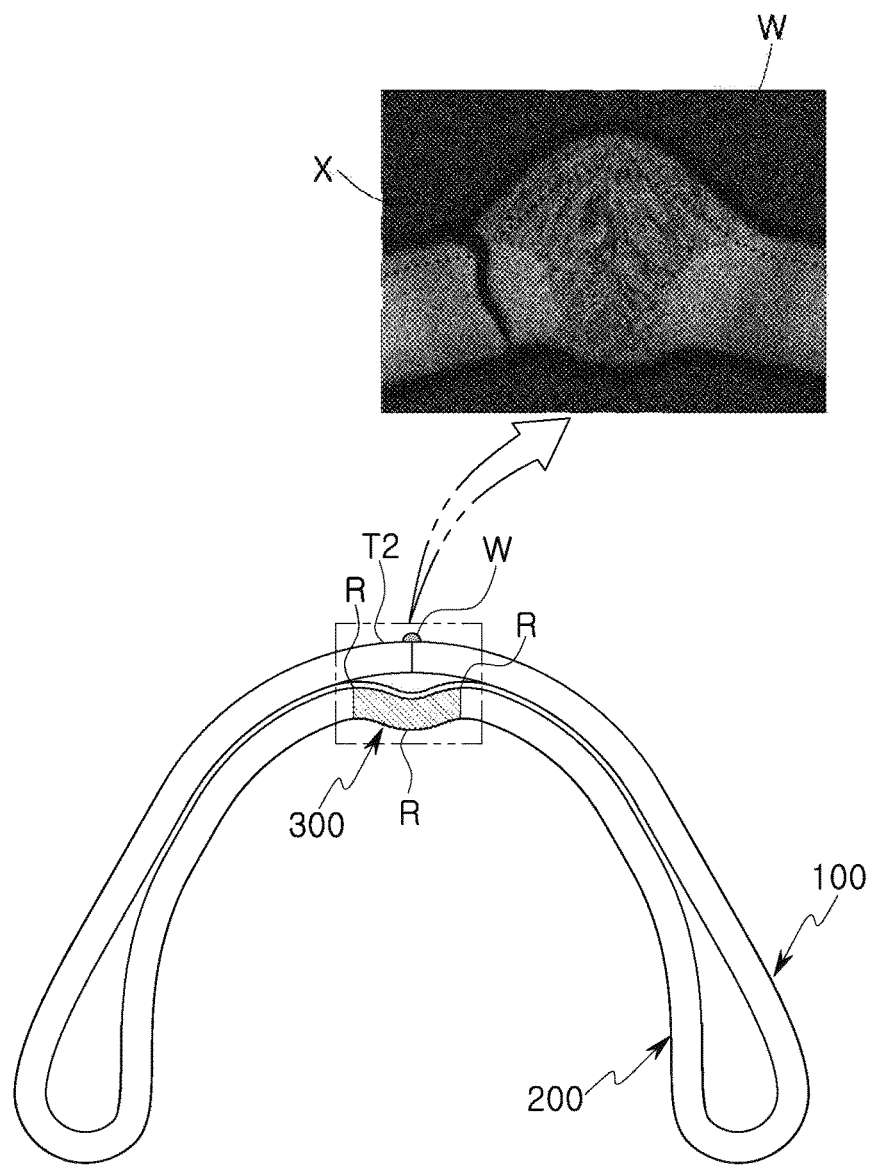

METHOD FOR MANUFACTURING TORSION BEAM

CROSS-REFERENCE OF RELATED APPLICATIONS

This application is the U.S. National Phase under 35 U.S.C. § 371 of International Patent Application No. PCT/KR2019/016284, filed on Nov. 25, 2019, which in turn claims the benefit of Korean Application No. 10-2018-0152529, filed on Nov. 30, 2018 the entire disclosures of which applications are incorporated by reference herein.

TECHNICAL FIELD

The present disclosure relates to a method of manufacturing a torsion beam having improved durability.

BACKGROUND ART

It should be noted that the content described in this section merely provides background information on the present disclosure and does not constitute prior art.

Suspension is a device absorbing shocks and vibrations from the road surface when driving a vehicle and determines driving performance, and may be classified into front suspension and rear suspension.

Various types of suspension systems are provided according to standards such as performance, weight, and manufacturing costs required by the vehicle, and in the case of rear suspension, a torsion beam type having low manufacturing costs and relatively excellent driving stability is mainly applied to light cars and semi-medium passenger cars.

A torsion beam is a type of suspension in which edge portions are combined with a trailing arm to ensure driving stability by torsion of a member when an external load is transferred to the wheel while driving, and torsion beams of various shapes are provided.

DISCLOSURE

Technical Problem

An aspect of the present disclosure is to provide a method of manufacturing a torsion beam, in which durability of a welded portion is improved through heat treatment.

Technical Solution

According to an aspect of the present disclosure, a method of manufacturing a torsion beam includes preparing a blank obtained by processing a plate material; forming an indented groove portion of the torsion beam by pressing the blank with a lower mold; rolling up the blank in such a manner that edge portions of the blank in a width direction oppose each other; a flattening operation of flattening the edge portions of the blank to be plastically deformed, by pressing the edge portions of the blank in the width direction with a protruding portion of an upper mold, in a state in which the edge portions of the blank in the width direction are supported to oppose each other by side cams; welding and joining the edge portions of the blank in the width direction, flattened in the flattening operation; and a quenching operation of heating an entirety of the welded and joined blank at a temperature ranging from 900 to 970° C. for a retaining time within a range of 1 to 20 minutes and cooling the blank in a treatment liquid including at least one of oil and water in a range of 20 to 90° C.

After the quenching operation, the method may include a tempering operation of heating the entirety of the blank subjected to the quenching operation to 150 to 600 degrees ° C. for a holding time in a range of 10 to 120 minutes, and cooling the blank in air.

Prior to the flattening operation, the method may include forming a protruding line in a direction opposite to an inward direction of the indented groove portion by pressing the blank with an upper mold having a protruding portion formed thereon.

The flattening operation may be performed by horizontally processing a matching surface of the blank, in a state in which the edge portions of the blank in the width direction oppose each other.

The flattening operation may be performed by flattening, such that a matching surface of the blank has an inclination angle ranging from −3.5 degrees to +3.5 degrees in a horizontal state, in a state in which the edge portions of the blank in the width direction oppose each other.

The flattening operation may be performed to plastically deform the blank in a state in which the protruding portion of the upper mold is located in a position corresponding to a protruding line of the blank.

A size of the protruding portion formed on the upper mold may be equal to or relatively smaller than a size of a protruding line of the blank.

The rolling up the blank may include a U-shape processing operation of fixing the blank with the upper mold and a pad, pushing the blank into the lower mold and rolling up the blank in such a manner that the blank has a 'UH'-shaped cross-section; and an O-shape processing operation of rolling up the blank up to a weldable position such that the edge portions of the blank in the width direction oppose each other and thus, the blank has an 'O'-shaped cross-section.

The rolling up the blank may be performed, by rolling up the edge portions of the blank in the width direction, in an inward direction of a protruding line, in a state in which a fixed mold is disposed in both end regions of the blank in a length direction.

The torsion beam may include a beam body extending in a length direction and having a cross-section in a width direction forming a closed cross-section; an indented groove portion formed to be inwardly indented in the length direction in the beam body; and a protruding line protruding from the indented groove portion toward an outside of the closed cross-section and extending in the length direction.

Advantageous Effects

According to an exemplary embodiment of the present disclosure, there is an effect of improving the durability of a welded portion through heat treatment.

DESCRIPTION OF DRAWINGS

FIG. 1 is a flow chart illustrating a method of manufacturing a torsion beam according to an exemplary embodiment of the present disclosure.

FIG. 2 is a view illustrating a method of manufacturing a torsion beam according to an exemplary embodiment of the present disclosure.

FIG. 3 is a view illustrating a blank preparation operation in a method of manufacturing a torsion beam according to an exemplary embodiment of the present disclosure.

FIG. 4 is a view illustrating an indented groove forming operation and a protruding line forming operation in a method of manufacturing a torsion beam according to an exemplary embodiment of the present disclosure.

FIG. 5 is a view illustrating a U-shape processing operation of a rolling-up operation in a method of manufacturing a torsion beam according to an exemplary embodiment of the present disclosure.

FIG. 6 is a view illustrating an O-shape processing operation of a rolling-up operation in a method of manufacturing a torsion beam according to an exemplary embodiment of the present disclosure.

FIG. 7A is a perspective view of a torsion beam applied to a method of manufacturing a torsion beam according to an exemplary embodiment of the present disclosure, as viewed from above.

FIG. 7B is a perspective view of a torsion beam applied to a method of manufacturing a torsion beam according to an exemplary embodiment of the present disclosure, as viewed from below.

FIGS. 8A and 9A are views illustrating a case in which a method of manufacturing a torsion beam according to an exemplary embodiment of the present disclosure, having a protruding portion formed on an upper mold of the present disclosure, is applied.

FIGS. 8B and 9B are diagrams illustrating a case of application of a method of manufacturing a torsion beam in a case in which a protruding portion is not formed on the upper mold, as compared with the present disclosure.

BEST MODE FOR INVENTION

Hereinafter, exemplary embodiments of the present disclosure will be described with reference to the accompanying drawings. However, embodiments of the present disclosure may be modified in various other forms, and the scope of the present disclosure is not limited to the embodiments described below. In addition, embodiments of the present disclosure are provided to more completely describe the present disclosure to those with average knowledge in the art. In the drawings, the shapes and sizes of elements may be exaggerated for clearer explanation.

Hereinafter, a method of manufacturing a torsion beam according to an exemplary embodiment of the present disclosure will be described in detail with reference to FIGS. 1 to 9B.

A method of manufacturing a torsion beam according to an exemplary embodiment of the present disclosure may include a blank preparation operation ((S1)), an indented groove forming operation (S2), a rolling-up operation (S3), a flattening operation (S4), a welding joining operation (S5), and a quenching operation (S7), and may additionally include a protruding line forming operation (S6) and a tempering operation S8.

Referring to FIGS. 1 to 9B, the method of manufacturing a torsion beam may include the blank preparation operation (S1) of preparing a blank S obtained by processing a plate material, the indented groove forming operation (S2) of pressing the blank S with a lower mold 30 to form an indented groove portion 200 of a torsion beam 10, a rolling-up operation (S3) of rolling up so that both edges of the blank S oppose each other in a width direction D2, a flattening operation (S4) in which a protruding portion 21 of an upper mold 20 presses both edges of the blank S in the width direction D2 to be plastically deformed to be flat, in a state in which both edges of the blank S in the width direction D2 are supported to oppose each other by side cams 40, the welding joining operation (S5) of welding and joining the flattened both edges of the blank S in the width direction D2, and a quenching operation (S7) of heating the welded and joined whole blank S at a temperature ranging from 900 to 970 degrees (° C.), forming a holding time in the range of 1 to 20 minutes, and cooling the blank S in a treatment liquid containing at least one of oil and water in the range of 20 to 90 degrees (° C.).

Referring to FIG. 1, the method of manufacturing a torsion beam according to an exemplary embodiment includes the quenching operation (S7) after the welding and joining operation, to heat treat the entire blank S, thereby preventing a softening phenomenon that may occur in a welded portion after welding in high-strength steel or the like. In addition, since the strength of the welded portion may have the same characteristics as the strength of a base metal portion other than the welded portion, there is an effect of improving the durability of the welded portion.

In this manner, the reason why the entire welded blank S is heated in the range of 900 to 970 degrees ° C. is that there is a problem, in which if the heating temperature is lower than 900 degrees in the quenching operation (S7), austenite is not generated, and if the heating temperature is higher than 970 degrees, the austenite crystal becomes coarse to reduce the final strength.

For example, the treatment liquid used in the quenching operation (S7) may be composed of 15 to 25% of oil by weight, and the rest: water and unavoidably-included impurities.

Referring to FIG. 1, the method of manufacturing a torsion beam may include, after the quenching operation (S7), a tempering operation (S8) of heating the entire blank S having been subjected to the quenching operation (S7) to 150 to 600 degrees (° C.) to form a holding time in the range of 10 to 120 minutes, and cooling the blank S in air.

In the tempering operation S8, to remove residual stress and induce recrystallization in the blank S that has undergone through the quenching operation (S7), a relatively long temperature holding time should be formed at a relatively low temperature, compared to the quenching operation (S7).

In this manner, the reason for heating the entire blank S to which the quenching operation (S7) was applied, at a temperature ranging from 150 to 600 degrees ° C., in the tempering operation (S8), is that if a heating temperature in the quenching operation (S7) is lower than 150 degrees ° C., the effect of tempering decreases, and if the heating temperature is higher than 600 degrees ° C., the martensite fraction may be too low, resulting in a problem in which the strength may decrease.

In addition, the reason for maintaining the holding time in the range of 10 to 120 minutes for the entire blank to which the quenching operation (S7) was applied, in the tempering operation S8, is that if the holding time in the tempering operation (S8) is less than 10 minutes, there is no effect of tempering and thus brittleness may be maintained high, and if the holding time in the tempering operation (S8) exceeds 120 minutes, the effect of the quenching operation (S7) may be lost.

In more detail, the blank S, which has undergone the quenching operation (S7), is heated to 200 to 550 degrees ° C. to form a holding time in the range of 10 to 120 minutes, and may be cooled in air.

For example, in the case of the blank S that has undergone up to the welding joining operation (S5), before the quenching operation (S7) and the tempering operation S8, the yield strength is 992 to 444 unit: MPa, and the tensile strength is 620 to 696 Unit: MPa, and the elongation unit: % is 22 to 25%.

As described above, the case of prior to the quenching operation (S7) and the tempering operation S8 is a state in which elongation is sufficiently secured, but the yield strength and tensile strength are significantly low, and thus, the method of manufacturing a torsion beam according to an exemplary embodiment of the present disclosure may include the quenching operation (S7) and the tempering operation S8.

In the quenching operation (S7), the entire blank S was heated at 900 degrees ° C. for 7 minutes, and 80% of water and 20% of oil in weight percent were applied as a treatment liquid in performing the quenching operation (S7), and as a result, the yield strength was 1186 MPa, the tensile strength was 1951 MPa, and the elongation was 6.6%.

In this case, the tensile strength was very high, but the ductility was insufficient, and thus, by heating at 200 degrees for 30 minutes in the next operation, the tempering operation, the yield strength was 1466 MPa, the tensile strength was 1830 MPa, and the elongation of 10.4% could be obtained.

As described above, it can be seen that the method of manufacturing a torsion beam according to an exemplary embodiment of the present disclosure further includes the quenching operation (S7) and the tempering operation S8, thereby generating a martensite structure to significantly improve yield strength and tensile strength, while securing sufficient elongation, and thus suppressing brittleness.

TABLE 1

| Heat treatment process | Conditions | Yield Strength MPa | Tensile Strength MPa | Elongation % |
|---|---|---|---|---|
|  | As received | 392-444 | 620-696 | 22-25 |
| Quenching Operation | 900° C., hold for 7 minutes | 1186 | 1951 | 6.6 |
| Tempering Operation | 200° C., hold for 30 minutes | 1466 | 1830 | 10.4 |

* Treatment liquid: 80% of water + 20% of oil

Referring to FIGS. 2 and 3, the blank preparation operation (S1) is an operation of preparing a blank S manufactured in a set shape by processing a plate material.

In the blank preparation operation (S1), the blank S having a set shape may be manufactured by cutting the plate material.

As an example, the blank S having a set shape may be prepared by cutting a plate material formed of a metal plate such as steel or the like.

As an example, the blank S may be comprised of a steel plate having a tensile strength of 780 MPa or more.

In more detail, the blank S may be formed of a steel plate having a tensile strength of 980 MPa or more.

Referring to FIGS. 2 and 4, in the indented groove forming operation (S2), the indented groove portion 200 of the torsion beam 10 may be formed by pressing the blank S with the lower mold 30.

In the indented groove forming operation (S2), the indented groove portion 200 of the torsion beam 10 may be formed by pressing the blank S with the lower mold 30 to deform the lower surface of the blank S upwardly.

Referring to FIG. 4, the inflow of the blank S may be controlled with the upper mold 20 and a holder 70, and the indented groove portion 200 may be formed in the torsion beam 10 by pressing the blank S with the lower mold 30 in a state in which the blank S is disposed between the upper mold 20 and the lower mold 30.

In this case, a plurality of guides 60 may be disposed to penetrate through the upper mold 20 and the holder 70.

Referring to FIGS. 2, 5 and 6, in the rolling-up operation (S3), edge portions of the blank S in the width direction D2 may be rolled up to oppose each other.

In the rolling-up operation (S3), the edge portions of the blank S in the width direction D2 may be rolled up in the protruding direction of a protruding line 300.

In the rolling-up operation (S3), the edge portions of the blank S in the width direction D2 of the blank S may be rolled up by the lower mold 30 or the side cam 40, to be opposed to each other.

Referring to FIGS. 5 and 6, the rolling-up operation (S3) may include a U-shaped processing operation (S3)-1 of fixing the components with the upper mold 20 and a pad 80, pushing the blank S into the lower mold 30, and rolling up the blank S to have a 'U'-shaped cross-section, and an O-shaped processing operation (S3)-2 of rolling up so that both edges of the blank S in the width direction D2 are rolled-up to a weldable position to be opposed to each other, to have an 'O'-shaped cross-section.

The torsion beam 10 may be processed to have an 'O'-shaped cross-sectional shape by the side cams 40 disposed on both side surfaces thereof.

When processing into an 'O'-shaped cross-sectional shape by the side cams 40, the torsion beam 10 should not be in contact with the protruding portion 21 of the upper mold 20.

This is to prevent the protrusion portion 21 of the upper mold 20 from being caught in a welded joint W of the blank S and thus causing unwanted deformation, when processed into an 'O'-shaped cross-sectional shape by the side cams 40.

For example, in the state in which the protruding portion 21 of the upper mold 20 is disposed between both edges of the blank S in the width direction D2, when the blank S is processed to have an 'O'-shaped cross-sectional shape by the side cams 40, deformation may occur in which the gap between both edges of the blank S in the width direction D2 is excessively widened by the protruding portion 21 of the upper mold 20.

Thereafter, when the torsion beam 10 is processed into an 'O'-shaped cross-sectional shape by the side cams 40 disposed on both sides, fine adjustments may be performed to fit the final shape of the torsion beam 10, while adjusting the upper mold 20, the lower mold 30, and the side cam 40.

Referring to FIG. 6, in the rolling-up operation (S3), edge portions of the blank S in the width direction D2 of the blank S may be rolled up in the inward direction of the protruding line 300 in a state in which fixed molds 50 are disposed in both end regions of the blank S in a length direction D1.

By disposing the fixed molds 50 in the both end regions of the blank S in the length direction D1, end portions of a beam body 100 may be produced to have a shape for coupling trailing arms.

Referring to FIG. 2, in the flattening operation (S4), in a state in which the edge portions of the blank S in the width direction D2 are supported by the side cams 40 to be opposed to each other, the protruding portion 21 of the upper mold 20 presses the edge portions of the blank S in the width direction D2 to be plastically deformed flat.

Referring to FIGS. 8A and 9A, in the flattening operation (S4), the matching surface of the blank S may be horizontally processed in the state in which both edge portions of the blank S in the width direction D2 oppose each other.

For example, the upper surface and the lower surface may be processed horizontally while both edge regions of the blank S in the width direction D2 are opposed to each other.

For example, in the flattening operation (S4), in a state in which edge portions of the blank S in the width direction D2 are opposed, the matching surface of the blank S may be flattening processed to be in the range of an inclination angle of −3.5 degrees to +3.5 degrees in a horizontal state.

As an example, in a state in which both edge portions of the blank S in the width direction D2 face each other, the opposed matching surfaces of the blank S may be flatly processed.

At least in a state in which edge portions of the blank S in the width direction D2 are adjacent, the upper mold 20 may press adjacent edge portions of the blank S to form the matching surfaces in parallel.

In this case, the edge portions of the blank S in the width direction D2, which have been disposed adjacently by the pressure of the upper mold 20, may be in contact with each other.

As another example, in the flattening operation (S4), the opposed matching surfaces of the blank S may be processed to be flat in a state in which the edge portions of the blank S in the width direction D2 contacting each other.

In the flattening operation (S4), in a state in which edge portions of the blank S in the width direction D2 are in contact, the upper mold 20 may press the edge portions of the blank S in contact with each other to form the matching surfaces in parallel.

Referring to FIGS. 8A and 9A, in the flattening operation (S4), plastic deformation may be formed in a state in which the protruding portion 21 of the upper mold 20 is disposed in a position corresponding to the protruding line 300 of the blank S.

In the case of FIGS. 8A and 9A, a method of manufacturing a torsion beam according to an exemplary embodiment, in which the protruding portion 21 is formed on the upper mold 20, is applied.

In the case of FIGS. 8B and 9B, a method of manufacturing a torsion beam, in a case in which the protruding portion 21 is not formed on the upper mold 20, as compared with the present disclosure, is applied.

Referring to FIGS. 8A and 9A, in the method of manufacturing the torsion beam 10 according to an exemplary embodiment of the present disclosure, the protrusion portion 21 of the upper mold 20 presses the matching surfaces of the blank S to induce plastic deformation thereof, thereby reducing the force that the blank (S) undergone the rolling-up operation (S3) is to be elastically restored.

Accordingly, while a flat surface T1 is formed to enable the matching surface to be flat, the shape precision of the welded joint W is secured to secure the integrity of the welded joint W to improve the durability of the welded joint W.

Referring to FIGS. 8B and 9B, unlike the present disclosure, in a case in which the protruding portion 21 is not formed on the upper mold 20, it can be seen that the matching surface is not flattened, and the matching surface has a curved surface (T2) having a considerable inclination angle in a horizontal state, and cracks (X) occurs in the welded joint (W), thereby deteriorating durability performance.

The size of the protruding portion 21 formed on the upper mold 20, applied in the flattening operation (S4), may be equal to or relatively smaller than the size of the protruding line 300.

As an example, the size of the protruding portion 21 formed on the upper mold 20, applied to the flattening operation (S4), may be equal to the size of the protruding line 300.

As another example, the size of the protruding portion 21 formed on the upper mold 20, applied to the flattening operation (S4), may be relatively smaller than the size of the protruding line 300.

Referring to FIG. 2, in the welding joining operation (S5), the edge portions of the flattened blank S in the width direction D2 may be welded and joined together.

Referring to FIG. 2, the method of manufacturing a torsion beam, prior to the flattening operation, may include the protruding line forming operation (S6) of forming the protruding line 300 in a direction opposite to the inward direction of the indented groove portion 200 by pressing the blank S with the upper mold 20 on which the protruding portion 21 is formed.

Referring to FIGS. 2 and 4, in the operation of forming a protruding line (S6), prior to the flattening operation (S4), the blank S is pressed with the upper mold 20 in which the protruding part 21 is formed, and the indented groove portion the protruding line 300 may be formed in a direction opposite to the inward direction of 200.

As an example, the protruding line forming operation (S6) may be performed between the indented groove forming operation (S2) and the rolling-up operation (S3).

As another example, after the protruding line forming operation (S6), the indented groove forming operation (S2) may be performed.

As an example, a method of manufacturing a torsion beam may be performed in the order of the blank preparation operation (S1), the indented groove forming operation (S2), the protruding line forming operation (S6), the rolling-up operation (S3), the flattening operation (S4), and the welding joining operation (S5).

In another example, a method of manufacturing a torsion beam may be performed in the order of a blank preparation operation (S1), a protruding line forming operation (S6), an indented groove forming operation (S2), a rolling-up operation (S3), a flattening operation (S4), and a welding joining operation (S5).

The method of manufacturing a torsion beam according to an exemplary embodiment of the present disclosure is exemplified as a preferred manufacturing method in order to enable a person having ordinary knowledge in the technical field of the present disclosure to easily implement the present disclosure. Modifications may be carried out in a different order or other ancillary processes may be added.

In addition, it will be apparent that various embodiments of the torsion beam 10 having various embodiments to be described later may be applied to the method of manufacturing a torsion beam according to an exemplary embodiment.

Referring to FIGS. 7A and 7B, the torsion beam 10 may include a beam body 100 extending in the length direction D1 and having a cross-section in the width direction D2, which forms a closed cross-section, an indented groove portion 200 inwardly indented in the beam body 100 in the length direction D1, and a protruding line 300 protruding from the indented groove portion 200 in an outward direction of the closed cross-section and extending in the length direction D1.

The torsion beam 10 is disposed in the width direction of the vehicle, and trailing arms may be joined to end portions of the torsion beam 10.

The torsion beam 10 according to an exemplary embodiment of the present disclosure may be formed of steel having a tensile strength of 780 MPa or more.

In more detail, the torsion beam 10 according to an exemplary embodiment may be formed of steel having a tensile strength of 980 MPa or more.

The beam body 100 may extend in the length direction D1, and the cross-section in the width direction D2 may form a closed cross section.

The beam body 100 has an effect of increasing the cross-sectional rigidity of the torsion beam 10 by forming a closed cross-section.

The cross-section of the beam body 100 is formed as a closed cross-section in which at least a portion of the inside is formed to have a hollow portion, and thus, has an effect of reducing the weight of the torsion beam 10 while increasing the cross-sectional rigidity of the torsion beam 10.

Trailing arms may be joined to both end portions of the beam body 100 in the length direction D1.

As an example, the trailing arms may be welded to both ends of the beam body 100 in the length direction D1.

As another example, the trailing arms may be fixed while the coupling members installed on the trailing arms are inserted into both end portions of the beam body 100 in the length direction D1.

In the case of the beam body 100, in a state in which edge portions of the blank S in the width direction D2 oppose each other, the edge portions of the blank S in the width direction D2 may be welded and joined in the state that the matching surface of the blank S is disposed horizontally.

In the case of the beam body 100, in a state in which both edge portions of the blank S oppose each other in the width direction D2, the edge portions of the blank S in the width direction D2 may be welded and joined in a state in which the matching surface of the blank S is disposed to have an inclination angle ranging from −3.5 degrees to +3.5 degrees in a horizontal state.

In this case, when the matching surface has −3.5 degrees in a horizontal state, it indicates that both edge portions of the blank S in the width direction D2 are inclined downward by about 3.5 degrees.

In addition, when the matching surface has +3.5 degrees in a horizontal state, it indicates that edge portions of the blank S in the width direction D2 are inclined upward by about 3.5 degrees.

The indented groove portion 200 is formed to be inwardly inserted in the beam body 100, and the indented groove portion 200 may be formed in the length direction D1 of the beam body 100.

The indented groove portion 200 may be indentedly formed in a 'V' shape in the beam body 100 or may be indented in a curved 'U' shape in the beam body 100.

The protruding line 300 may protrude from the indented groove portion 200 toward the outside of the closed cross-section of the beam body 100.

The protruding line 300 may form a plurality of inflection points R together with the indented groove portion 200, thereby increasing cross-sectional rigidity of the torsion beam 10.

In this case, the indented groove portion 200 forms at least 9 inflection points R on the indented groove portion 200 in a state inserted in the inward direction of the closed cross-section of the beam body 100, while the protruding line 300 protrudes in a direction from the indented groove portion 200 to the outside of the closed cross-section of the beam body 100, thereby increasing the cross-sectional rigidity of the torsion beam 10.

Referring to FIGS. 8A and 9A, the protruding line 300 may be formed to have a 'U' shape by protruding in a direction from the indented groove portion 200 to the outside of the closed cross-section of the beam body 100.

In this case, the protruding line 300 may have a 'U'-shaped open portion disposed in the inner direction of the closed cross-section of the beam body 100.

Although not illustrated, the protruding line 300 may be formed to protrude in a 'V' shape from the indented groove portion 200 toward the outside of the closed cross-section of the beam body 100.

In this case, the protruding line 300 may have a 'V'-shaped open portion disposed in the inner direction of the closed cross-section of the beam body 100.

When the protruding line 300 protrudes in a 'U' shape or protrudes in a 'V' shape, the protruding line 300 may form three inflection points R together with the indented groove portion 200.

Although not illustrated, the protruding line 300 may be formed to protrude in a '⊏' shape from the indented groove portion 200 toward the outside of the closed cross-section of the beam body 100.

In this case, the protruding line 300 may have an open portion of a '⊏' shape in the inner direction of the closed cross-section of the beam body 100.

When the protruding line 300 is formed to protrude in a '⊏' shape, the protruding line 300 may form four inflection points R together with the indented groove portion 200.

Referring to FIGS. 7A and 9A, the protruding line 300 may be formed to protrude from a groove center 210 of the indented groove portion 200 toward the outside of the closed cross-section.

The protruding line 300 may be formed in the length direction D1 along the groove center 210 of the indented groove portion 200.

In this case, while being formed in the length direction D1 along the groove center 210 of the indented groove portion 200, the protruding line 300 may be formed over at least 60% or more of the total length of the groove center 210 of the indented groove portion 200.

As an example, the protruding line 300 may be formed over the entirety of the groove center 210 formed in the length direction D1 of the intended groove portion 200.

As an example, referring to FIGS. 7A and 7B, the protruding line 300 may be formed over the entirety of the groove center 210 in the length direction D1, formed in the length direction D1 of the indented groove portion 200, and over end inclined points 230 of both sides of the indented groove portion 200, in which an upward slope is formed from the end of the groove center 210.

In detail, the indented groove portion 200 is configured with the groove center 210 corresponding to the low point of the indented groove portion 200 and extending in the length direction D1, and the end inclined points 230 forming inclined surfaces upwardly from ends of both sides of the groove center 210.

Stress tends to be concentrated at the boundary between the groove center 210 and the end inclined points 230.

In the present disclosure, by forming the protruding line 300 over the groove center 210 of the indented groove portion 200 and over the end inclined points 230 on both sides, there is an effect of improving the durability against stress concentration by reinforcing the boundary between the groove center 210 and the end inclined points 230 by the protruding line 300.

Although the embodiments of the present disclosure have been described in detail above, the scope of the present disclosure is not limited thereto, and various modifications and variations are possible without departing from the technical spirit of the present disclosure described in the claims, which will be obvious to those of ordinary skill in the art.

DESCRIPTION OF REFERENCE NUMERALS

10: torsion beam
20: upper mold
21: protruding portion
30: lower mold
40: side cam
50: fixed mold
60: guide
70: holder
80: pad
100: beam body
200: indented groove portion
210: groove center
230: end inclined point
300: protruding line
D1: length direction
D2: width direction
R: inflection point
S: blank
S1: blank preparation operation
S2: indented groove forming operation
S3: rolling-up operation
S3-1: U-type processing operation
S3-2: O-type processing operation
S4: flattening operation
S5: welding joining operation
S6: protruding line forming operation
S7: quenching operation
S8: tempering operation
T1: flat surface
T2: curved surface
W: welded joint
X: cracks

The invention claimed is:

1. A method of manufacturing a torsion beam, comprising:
    preparing a blank obtained by processing a plate material;
    forming an indented groove portion of the torsion beam by pressing the blank with a lower mold;
    rolling up the blank in such a manner that edge portions of the blank in a width direction oppose each other;
    a flattening operation of flattening the edge portions of the blank to be plastically deformed, by pressing the edge portions of the blank in the width direction with a protruding portion of an upper mold, in a state in which the edge portions of the blank in the width direction are supported to oppose each other by side cams;
    welding and joining the edge portions of the blank in the width direction, flattened in the flattening operation; and
    a quenching operation of heating an entirety of the welded and joined blank at a temperature ranging from 900 to 970° C. for a retaining time within a range of 1 to 20 minutes and cooling the blank in a treatment liquid including at least one of oil and water in a range of 20 to 90° C.

2. The method of manufacturing a torsion beam of claim 1, wherein after the quenching operation, the method comprises a tempering operation of heating the entirety of the blank subjected to the quenching operation to 150 to 600 degrees (° C.) for a holding time in a range of 10 to 120 minutes, and cooling the blank in air.

3. The method of manufacturing a torsion beam of claim 1, wherein prior to the flattening operation, the method comprises forming a protruding line in a direction opposite to an inward direction of the indented groove portion by pressing the blank with an upper mold having a protruding portion formed thereon.

4. The method of manufacturing a torsion beam of claim 1, wherein the flattening operation is performed by horizontally processing a matching surface of the blank, in a state in which the edge portions of the blank in the width direction oppose each other.

5. The method of manufacturing a torsion beam of claim 1, wherein the flattening operation is performed by flattening such that a matching surface of the blank has an inclination angle ranging from −3.5 degrees to +3.5 degrees in a horizontal state, in a state in which the edge portions of the blank in the width direction oppose each other.

6. The method of manufacturing a torsion beam of claim 1, wherein the flattening operation is performed to plastically deform the blank in a state in which the protruding portion of the upper mold is located in a position corresponding to a protruding line of the blank.

7. The method of manufacturing a torsion beam of claim 1, wherein a size of the protruding portion formed on the upper mold is equal to or relatively smaller than a size of a protruding line of the blank.

8. The method of manufacturing a torsion beam of claim 1, wherein the rolling up the blank comprises:
    a U-shape processing operation of fixing the blank with the upper mold and a pad, pushing the blank into the lower mold and rolling up the blank in such a manner that the blank has a 'U'-shaped cross-section; and
    an O-shape processing operation of rolling up the blank up to a weldable position such that the edge portions of the blank in the width direction oppose each other and thus, the blank has an 'O'-shaped cross-section.

9. The method of manufacturing a torsion beam of claim 1, wherein the rolling up the blank is performed, by rolling up the edge portions of the blank in the width direction, in an inward direction of a protruding line, in a state in which a fixed mold is disposed in both end regions of the blank in a length direction.

10. The method of manufacturing a torsion beam of claim 1, wherein the torsion beam comprises:
    a beam body extending in a length direction, and having a cross-section in a width direction, forming a closed cross section;
    an indented groove portion formed to be inwardly indented in the length direction in the beam body; and
    a protruding line protruding from the indented groove portion toward an outside of the closed cross-section and extending in the length direction.

* * * * *